United States Patent [19]

Suzuki

[11] Patent Number: 5,610,652
[45] Date of Patent: Mar. 11, 1997

[54] ELECTROPHOTOGRAPHIC IMAGE RECORDING APPARATUS

[75] Inventor: Makoto Suzuki, Nagoya, Japan

[73] Assignee: Brother Kogyo Kabushiki Kaisha, Nagoya, Japan

[21] Appl. No.: 253,321

[22] Filed: Jun. 3, 1994

[30] Foreign Application Priority Data

Jun. 7, 1993 [JP] Japan ................................ 5-135559

[51] Int. Cl.⁶ ............................. B41J 2/47; B41J 2/385; G01D 9/00; G01D 9/42
[52] U.S. Cl. ..................... 347/256; 347/261; 347/251; 347/129; 347/134; 346/150.1; 346/107.3; 346/107.5; 346/45
[58] Field of Search ...................... 355/210, 232, 355/204, 205, 207, 288; 358/443, 448, 296; 346/150.1, 107.3, 107.5, 45; 347/241, 256, 261, 243, 244, 240, 251, 129, 134, 23

[56] References Cited

U.S. PATENT DOCUMENTS 5,017,961  5/1991  Hasegawa ............................. 347/129
5,352,883  10/1994  Kitani et al. ........................ 347/23

FOREIGN PATENT DOCUMENTS 4-271383  9/1992  Japan.

Primary Examiner—Benjamin R. Fuller
Assistant Examiner—Raquel Yvette Gordon
Attorney, Agent, or Firm—Oliff & Berridge

[57] ABSTRACT

In the electrophotographic image recording apparatus, the optical path switching mechanism switches the optical path between an image reading mode and an image recording mode. In the image reading mode, the optical path switching mechanism directs light from a light scanning portion toward the original. Light reflected from the original is guided by a light guiding mechanism to a light receiving element where the light is converted into electrical signals.

18 Claims, 7 Drawing Sheets

ELECTROPHOTOGRAPHIC IMAGE RECORDING APPARATUS

BACKGROUND OF THE INVENTION

1. Field of the Invention

The present invention relates to an electrophotographic image recording apparatus, and more particularly to an electrophotographic image recording apparatus of a type employed with both an image reading portion and an image recording portion.

2. Description of the Related Art

There has been conventionally proposed an electrophotographic image recording apparatus, such as a digital image copying machine, of a type which is employed with both an image reading portion and an image recording portion.

As shown in FIG. 1, the image reading portion 81 of this apparatus generally includes an image reading head 84 constructed from a combination of a light source 82 such as a rod-shaped fluorescent lamp and an image receiving element 80 such as a contact type image sensor or a CCD image sensor. The fluorescent lamp 82 extends in a main scanning direction A which extends orthogonal to the sheet of drawing of FIG. 1. The fluorescent lamp 82 emits a light beam in a direction toward an original stand 86. The light beam passes through the original stand 86 and reflects off an original 88 located on the original stand 86 so as to bear thereon a line image of the original. The line image-bearing light then travels to the image receiving element 80. The image receiving element 80 thus receiving the optical line image converts it into electrical signals.

The original stand 86 is conveyed in an auxiliary scanning direction B orthogonal to the main scanning direction A so that all the line images on the original 88 are sequentially picked up to be converted into electrical image signals. The electrical image signals are then fed to an image recording portion 91.

The image recording portion 91 includes a light scanning unit 90 and a photosensitive drum 92. The light scanning unit 90 includes: a spot light beam source 94 for intermittently emitting a spot light beam in accordance with the electrical image signals; and a light scanning mechanism 96 for receiving the light beam from the light source 94 and for scanningly guiding the light beam onto the photosensitive drum 92. The light scanning mechanism 96 scans the light beam spot on the photosensitive drum 92 in a direction parallel to its rotational axis X. The photosensitive drum 92 rotates about the rotational axis while being irradiated with the light beam scanned by the light scanning unit 90. Accordingly, the photosensitive drum 92 is formed with a latent image corresponding to the electrical image signals. The latent image is developed into a visible image by a developing unit (not shown in the drawing) and is transferred to an output medium such as a sheet. Thus, the sheet is formed an image the same as that of the original.

As described above, the conventional electrophotographic image recording apparatus requires the two separate light sources 82 and 94 for the image reading portion 81 and the light scanning portion 90. Especially, in the case where the image receiving element 80 is constructed from the contact type image sensor, because the contact type image sensor is expensive, the entire apparatus may not be manufactured with low cost. In the case where the image receiving element 80 is constructed from the CCD image sensor, various optical parts such as a converging lens must be mounted between the original stand 86 and the CCD image sensor. In this case, the entire apparatus becomes expensive as well as large.

SUMMARY OF THE INVENTION

It is therefore an object of the present invention to overcome the above-described drawbacks and to provide an improved electrophotographic image recording apparatus which has both an image reading portion and an image recording portion but which has a simple structure.

In order to attain the object and other objects, the present invention provides an image reading and recording apparatus, for reading an image from an original and for recording a latent image on a photosensitive medium, comprising: a light scanning portion for scanning a spot light beam in a predetermined scanning direction; an image reading portion for imaging, on an original, the light beam scanned by the light scanning portion, to thereby read out a plurality of picture elements arranged on the original in a direction corresponding to the predetermined scanning direction; an image recording portion for imaging, on a photosensitive medium, the light beam scanned by the light scanning portion, to thereby form a plurality of latent picture elements on the photosensitive medium arranged in another direction corresponding to the predetermined scanning direction; and an optical path switching member for selectively guiding the light beam scanned by the light scanning portion to one of the image recording portion and the image reading portion.

The optical path switching member may preferably include: a reflective member for receiving the light beam scanned by the light scanning portion and for reflecting the light beam; and an angular position changing member for changing an angular position of the reflective member between a first angular position for reflecting the light beam to the photosensitive medium and a second angular position for reflecting the light beam to the original.

The light scanning portion may preferably include: a light source for emitting a spot light beam; and a light scanner for receiving the spot light beam and for scanning the spot light beam in the predetermined scanning direction. The optical path switching member may further include a light source controller for controlling the light source to emit the spot light beam of uniform intensity when the reflective member is located on the second angular position and for controlling the light source to modulate intensity of the spot light beam in accordance with image signals in synchronization with the scanning operation by the light scanning portion so as to form, on the photosensitive medium, the plurality of latent picture elements corresponding to the image signals when the reflective member is located on the first angular position.

The image reading portion may preferably include a light intensity detecting member for receiving the spot light beam reflected from the original and photoelectrically converting the received spot light beam into an electrical signal indicative of an intensity of the spot light beam, the light intensity detecting member photoelectrically converting the received spot light beam in synchronization with the scanning operation by the light scanning portion to thereby produce a series of electrical signals which indicate respective ones of the plurality of picture elements arranged on the original.

The reflective member located on the second angular position may guide the light beam reflected from the original back to the light scanner and the light scanner may guide the light beam in a direction back to the light source. A light beam directing member may be provided at a position between the light source and the light intensity detecting member and the light scanner, the light beam directing member directing the light beam originally emitted from the light source to the light scanner while directing the light beam from the light scanner to the light intensity detecting member to be detected thereby.

According to another aspect, the present invention provides an electrophotographic image recording apparatus, for reading an image from an original and for electrophotographically recording an image on a desired image output medium, comprising: an input port for inputting image signals indicative of an image desired to be formed on an image output medium; a light source for emitting a light beam; a light source controller for controlling the light source to emit the light beam; a light scanning device for receiving the light beam emitted from the light source and for scanning the light beam in a main scanning direction; an original conveying device for conveying an original in an auxiliary scanning direction orthogonal to the main scanning direction; a photosensitive medium conveying device for conveying a photosensitive medium in another auxiliary scanning direction orthogonal to the main scanning direction; a light guiding member for receiving the light beam scanned by the light scanning device and for selectively guiding the light beam to either one of the original conveyed by the original conveying device and the photosensitive medium conveyed by the photosensitive medium conveying device; a mode selecting device for selecting one of an image reading mode for reading out an image from the original and an image recording mode for recording a desired image on the output medium; a switching control device for controlling the light source and the light guiding member, the switching control device controlling, at the image reading mode, the light source to continually emit the light beam with uniform intensity and the light guiding member to guide the light beam to the original, the light beam thus guided to the original reflecting thereat to bear thereon information on the image on the original, the switching control device controlling, at the image recording mode, the light source to modulate intensity of the light beam to be emitted therefrom dependently on the image signals inputted from the input port in synchronization with the scanning operation by the light scanning device and the light guiding member to guide the light beam to the photosensitive medium conveyed by the photosensitive medium conveying device, the light beam thus guided to the photosensitive medium forming thereon a latent image corresponding to the image signals; a light beam intensity detecting device for detecting intensity of the light beam reflected from the original in synchronization with the scanning operation by the light scanning device and for photoelectrically converting the detected intensity into a series of electrical signals; an output port for outputting the series of electrical signals produced by the light beam intensity detecting device; and an electrophotographic image recording device for developing the latent image formed on the photosensitive medium into a visible image and transferring the visible image on a desired output medium.

The light guiding member selected to guide the light beam to the original may also guide the light beam reflected from the original back to the light scanning device, the light scanning device directing the light in a direction back to the light source. A light beam directing member may be located at a position between the light source and the light scanning device for directing the light guided back from the light scanning device to the light beam intensity detecting device, the light beam directing member directing the light originally emitted from the light source to the light scanning device.

The electrophotographic image recording apparatus may further comprise an imaging member located at a position between the light source and the light scanning device for receiving the light beam emitted from the light source, the imaging member being capable of imaging the light beam onto the original and the photosensitive medium, the imaging member forming a light beam spot on the original to read out every picture element of the image on the original and forming a light beam spot on the photosensitive drum to every picture element of the latent image.

According to further aspect, the present invention provides an electrophotographic image copying apparatus, for reading an image from an original in an image reading step and for electrophotographically recording an image the same as the image of the original on a desired image output medium in an image recording step, comprising: a light source for emitting a light beam; a light source controller for controlling the light source to emit the light beam; a light scanning device for receiving the light beam emitted from the light source and for scanning the light beam in a main scanning direction; an original conveying device for conveying an original in an auxiliary scanning direction orthogonal to the main scanning direction; a photosensitive medium conveying device for conveying a photosensitive medium in another auxiliary scanning direction orthogonal to the main scanning direction; a light guiding member for receiving the light beam scanned by the light scanning device and for selectively guiding the light beam to either one of the original conveyed by the original conveying device and the photosensitive medium conveyed by the photosensitive medium conveying device; a light beam intensity detecting device for detecting intensity of the light beam guided to and reflected at the original in synchronization with the scanning operation by the light scanning device and for photoelectrically converting the detected intensity into a series of electrical signals; a switching control device for controlling both the light source and the light guiding member, the switching control device controlling, in an image reading step, the light source to continually emit the light beam with uniform intensity and the light guiding member to guide the light beam to the original in order to read out an image from the original, the light beam thus guided to the original reflecting thereat to bear thereon information on the image on the original, the switching control device controlling, in an image recording step, the light source to modulate intensity of the light beam to be emitted therefrom dependently on the electrical signals produced by the light beam intensity detecting device in synchronization with the scanning operation by the light scanning device and the light guiding member to guide the light beam to the photosensitive medium conveyed by the photosensitive medium conveying device, the light beam thus guided to the photosensitive medium forming thereon a latent image corresponding to the image signals; and an electrophotographic image recording device for developing the latent image formed on the photosensitive medium into a visible image and transferring the visible image on a desired output medium.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
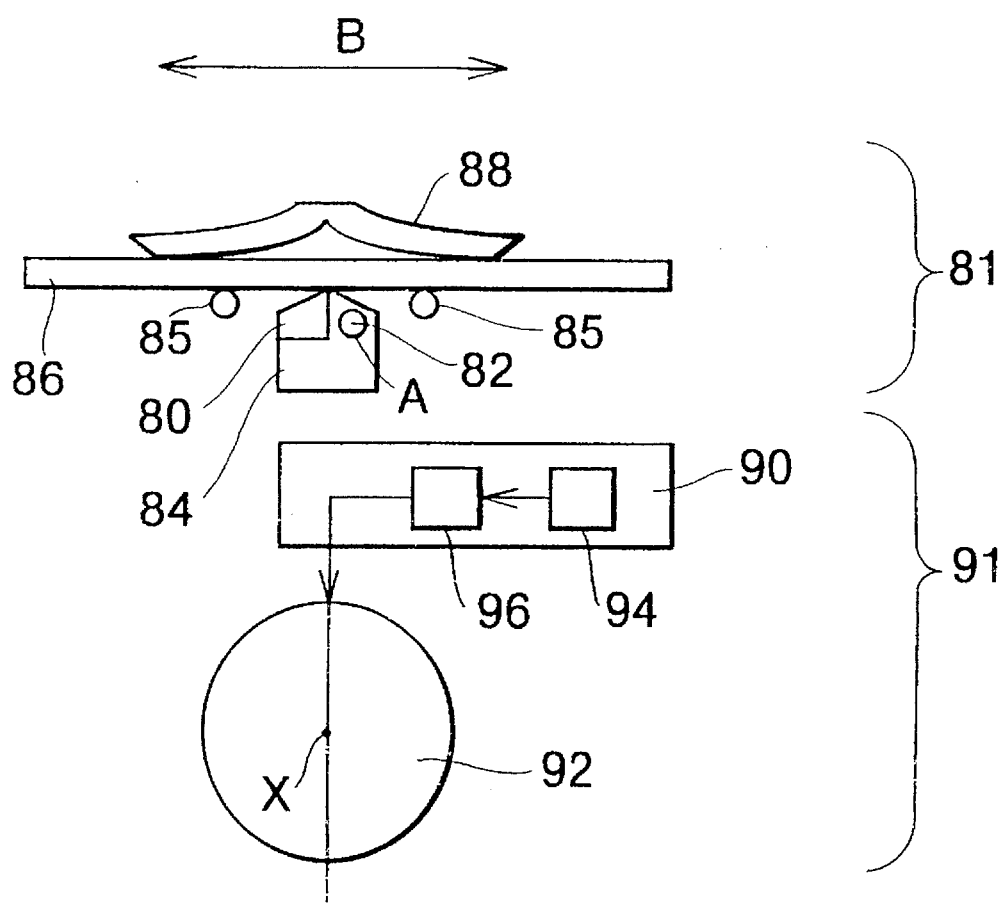
FIG. 1 is a schematic side view showing a structure of a conventional electrophotographic image recording apparatus of a type employed with both the image recording portion and the image reading portion.

Referring to the accompanying drawings, a preferred embodiment of the invention will be described wherein like parts and components are designated by the same reference numerals to avoid duplicating description.

Figure 2:
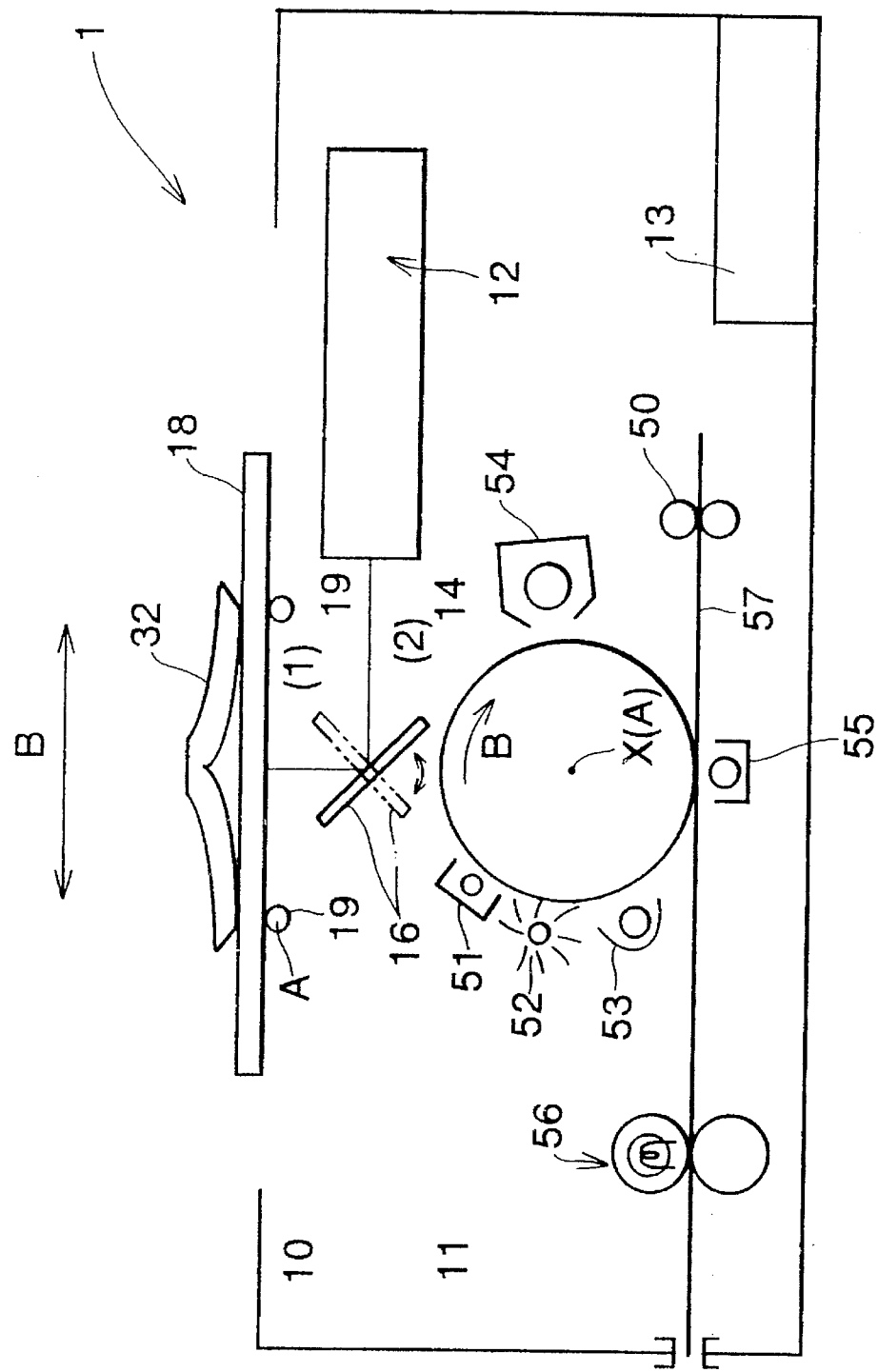
FIG. 2 is a schematic side view showing a structure of an electrophotographic image recording apparatus of a type employed with both the image recording portion and the image reading portion according to a preferred embodiment of the present invention.

An electrophotographic image recording apparatus 1 of the present embodiment is provided with both an image reading portion 10 and an image recording portion 11, as shown in FIG. 2. When the apparatus 1 is operated in an image reading mode, the apparatus actuates the image reading portion 10 to thereby operate as an image reader. When the apparatus is operated in an image recording mode, the apparatus actuates the image recording portion 11 to thereby operate as a laser printer.

As shown in FIG. 2, the electrophotographic image recording apparatus 1 of the present embodiment includes: a light scanning portion 12; the image reading portion 10; the image recording portion 11; an optical path switching mechanism 16; and a control portion 13. The light scanning portion 12 is provided for performing light scanning operation both in the image reading mode and in the image recording mode. The image reading portion 10 is operated in the image reading mode for reading out an image from an original 32 with light scanned by the light scanning portion 12. The image recording portion 11 is operated in the image recording mode for performing an electrophotographic image recording operation also with the light scanned by the light scanning portion 12. The optical path switching mechanism 16 is provided for directing the light scanned by the light scanning unit 12 toward the image reading portion 10 in the image reading mode and toward the image recording portion 11 in the image recording mode. The control portion 13 is provided for controlling the entire operation of the apparatus 1.

The image reading portion 10 is constructed from an original stand 18 for mounting thereon the original 32. The original stand 18 is mounted on a pair of convey rollers 19. The pair of convey rollers 19 are rotatably driven by a drive motor 17 shown in FIG. 4. The convey rollers 19 extend in a main scanning direction A perpendicular to the surface of the sheet of drawing of FIG. 2. Accordingly, the rotation of the convey rollers 19 conveys the original stand 18 in an auxiliary scanning direction B indicated in FIG. 2 that is orthogonal to the main scanning direction A.

In the image recording portion 11, a photosensitive drum 14 is mounted rotatably about its central axis X which also extends in the main scanning direction A. The photosensitive drum 14 is of a cylindrical shape extending along the central axis X and is covered with photosensitive material at its outer peripheral surface. The photosensitive drum 14 is rotatably driven by a motor 25 shown in FIG. 4. While the photosensitive drum 14 is rotated about its central axis, the outer peripheral surface of the photosensitive drum 14 moves in the auxiliary scanning direction B orthogonal to the main scanning direction A. In confrontation with the outer periphery of the photosensitive drum 14 are provided: an image developing unit 54; an image transferring unit 55; an electric discharger 53; a cleaner 52; and a charger 51. The image developing unit 54 is for developing a latent image formed on the outer peripheral surface of the photosensitive drum 14 into a visible image with the use of toner. The image transferring unit 55 is for transferring the developed visible image onto a sheet 57. The electric discharger 53 is for discharging the outer peripheral surface of the photosensitive drum 14. The cleaner 52 is for removing residual toner from the photosensitive drum 14. The charger 51 is for electrostatically charging the outer peripheral surface of the photosensitive drum 14. The image recording portion 11 is further mounted with: a pair of sheet transport rollers 50 for transporting the sheet 57; and a fixing unit 56 for fixing the visible image onto the sheet 57.

Figure 3:
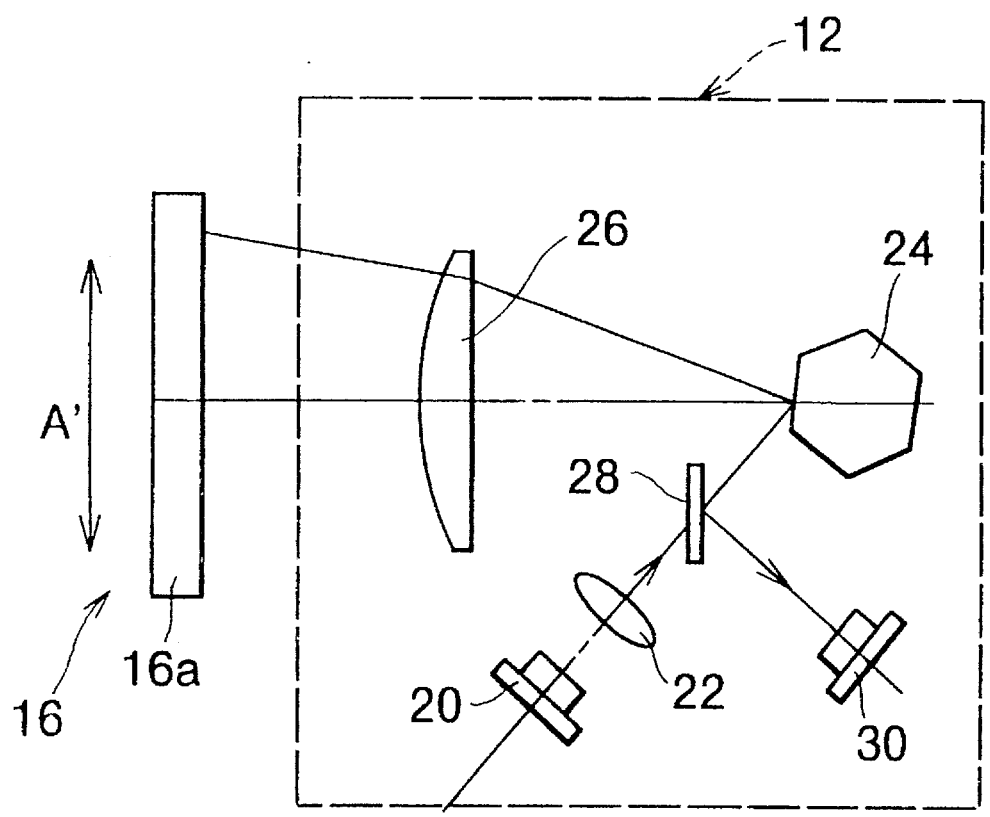
FIG. 3 is a schematic top view showing an optical system of a light scanning portion employed in the electrophotographic image recording apparatus of FIG. 2.
Figure 4:
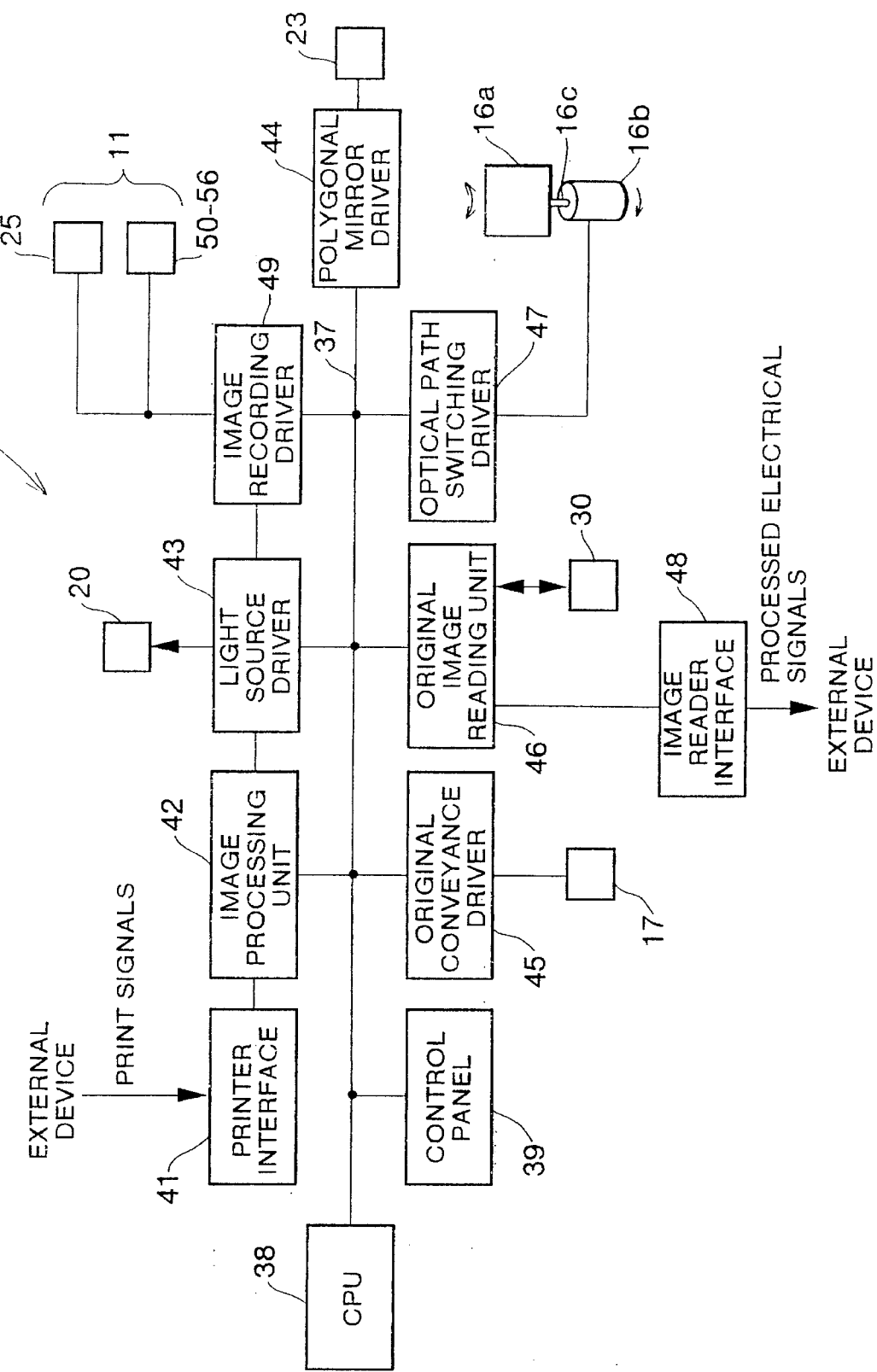
FIG. 4 is a block diagram of a control portion employed in the electrophotographic image recording apparatus of FIG. 2.

As shown in FIG. 3, the light scanning portion 12 includes: a single light source 20; a collimating optical system or lens 22; a rotational polygonal mirror 24 rotatably driven by a driving means 23 such as a motor shown in FIG. 4; and a fθ lens system 26. The light source 20 is constructed for emitting a spot light beam and is capable of emitting the spot light beam both continually and intermittently. The light source 20 is made from a semiconductor laser, for example.

Figure 6:
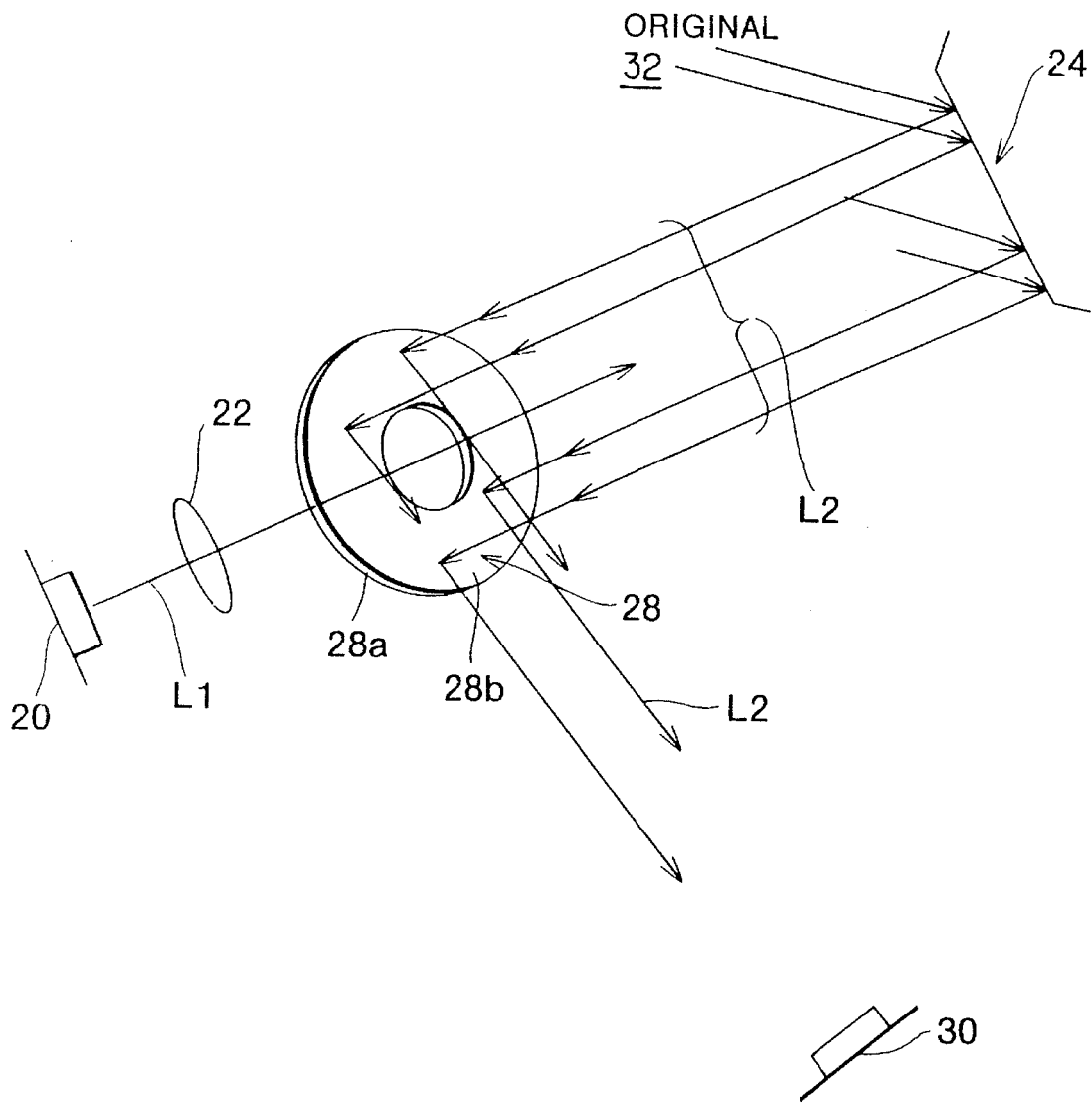
FIG. 6 is a perspective view schematically showing a structure of the light guiding member 28 employed in the light scanning portion 12 of FIG. 2.

The light scanning portion 12 further includes: a light guiding mechanism 28 located between the collimating optical system 22 and the rotational polygonal mirror 24; and a light intensity detecting element 30 for receiving light guided by the light guiding mechanism 28 and for detecting intensity of the received light. The light guiding mechanism 28 is preferably constructed from an annular-shaped mirror as shown in FIG. 6. The annular-shaped mirror 28 has opposed surfaces 28a and 28b. The mirror 28 is located such that the surface 28a confronts the light source 20 via the lens 22 and the surface 28b confronts both the polygonal mirror 24 and the light intensity detecting element 30. The surface 28b is a mirror-polished surface. The light guiding mechanism 28 may also be made from a half mirror. The light intensity detecting element 30 is constructed for receiving a light beam and for converting intensity of the received beam into an electrical signal. The light intensity detecting element 30 is preferably made from a photodiode, for example.

The optical path switching mechanism 16 is constructed from a combination of: a reflective member 16a such as a mirror or a prism provided with a rotational shaft 16c; and a driving member 16b such as a motor for rotating the rotational shaft 16c to thereby rotate the reflective member 16a, as shown in FIG. 4. The driving member 16b rotates the reflective member 16a by about 90 degrees. When the driving member 16b rotates the reflective member 16a into an angular position (1) indicated by a dotted line in FIG. 2, the reflecting member 16a reflects the light beam from the light scanning portion 12 in a direction toward the outer peripheral surface of the photosensitive drum 14. When the driving member 16b rotates the reflective member 16a into another angular position (2) indicated by a solid line in FIG.

2, the reflecting member 16a reflects the light beam from the light scanning portion 12 in a direction toward the original stand 18.

It is noted that the distance between the reflecting member 16a and the top surface of the original stand 18 is set to a value allowing the optical system of the light scanning portion 12 to properly converge the light beam to form a beam spot on the surface of the original 32 mounted on and contacted to the top surface of the original stand 18. The beam spot thus formed on the original performs to read out every picture element on the original 32. Similarly, the distance between the reflecting member 16a and the outer peripheral surface of the photosensitive drum 14 is set to a value allowing the optical system of the light scanning portion 12 to properly converge a light beam to form the beam spot on the photosensitive drum 14. The beam spot performs to record every picture element of a latent image on the photosensitive drum 14. Accordingly, the distance between the reflective member 16a and the top surface of the original stand 18 is equal to the distance between the reflective member 16a and the outer peripheral surface of the photosensitive drum 14.

The polygonal mirror 24 is mounted rotatably about its rotational axis which extends in a direction orthogonal to the main scanning direction A. The polygonal mirror 24 is driven by a motor 23, shown in FIG. 4, to rotate about the rotational axis with a constant angular speed. Accordingly, while the polygonal mirror 24 rotates, the polygonal mirror 24 scans the light in a direction A' parallel to the main scanning direction A. Accordingly, the combination of the rotating polygonal mirror 24 and the reflective member 16a located at the angular position (1) indicated by the dotted line of FIG. 2 scans the light beam on the outer periphery of the photosensitive medium in the main scanning direction A. Similarly, combination of the rotating polygonal mirror 24 and the reflective member 16a located at the other angular position (2) indicated by the solid line of FIG. 2 scans the light beam on the original 32 mounted on the original stand 18 in the main scanning direction A.

The control portion 13 is made from a microcomputer, for example. As shown in FIG. 4, the control portion 13 includes: a main central processing unit (CPU) 38; a control panel 39; a printer interface 41; an image processing unit 42; a light source driving circuit 43; a polygonal mirror driving circuit 44; an original conveyance driving unit 45; an electrophotographic image record driving unit 49; an original image reading unit 46; an image reader interface 48; and an optical path switch driving unit 47. These parts are connected via a bus line 37.

The control panel 39 is mounted on an outer top surface of the apparatus. The control panel 39 is provided with a power switch and an image reading mode selecting button and an image recording mode selecting button for selecting either one of the image reading mode and the image recording mode desired to be performed by the apparatus 1. The printer interface 41 is provided for inputting print signals supplied from an external device. The image processing unit 42 is provided for processing the supplied print signals into image signals proper to drive the light source 20. The light source driving circuit 43 is for driving the light source 20. The polygon mirror driving circuit 44 is for driving the motor 23 to rotate the polygon mirror 24. The original conveyance driving unit 45 is for actuating the motor 17 so as to rotate the convey rollers 19 and convey the original 32 in the auxiliary scanning direction B. The original image reading unit 46 is for controlling the light intensity detecting element 30 to photoelectrically convert the intensity of the received light into an electrical signal. The original image reading unit 46 is further for processing the electrical signal photoelectrically converted by the light intensity detecting element 30. The optical path switch driving unit 47 is for driving or actuating the motor 16b to locate the reflective member 16a at either one of the two angular positions (1) and (2) of FIG. 2. The image reader interface 48 is for outputting the electrical signals processed in the original image reading unit 46 to an external device. The electrophotographic image recording control unit 49 is provided for controlling the image recording unit 11 to perform the electrophotographic image recording operation. That is, the control unit 49 is for driving or actuating the motor 25 to rotate the photosensitive drum 14 about its axis X and other parts 50, 51, 52, 53, 54, 55 and 56 to perform their operations.

The image recording apparatus 1 having the above-described structure operates, as will be described below.

After turning ON the power switch of the control panel 39, an operator depresses either one of the image reading mode selecting button and the image recording mode selecting button to select a desired one of the image reading mode and the image recording mode to be conducted.

Figure 5A:
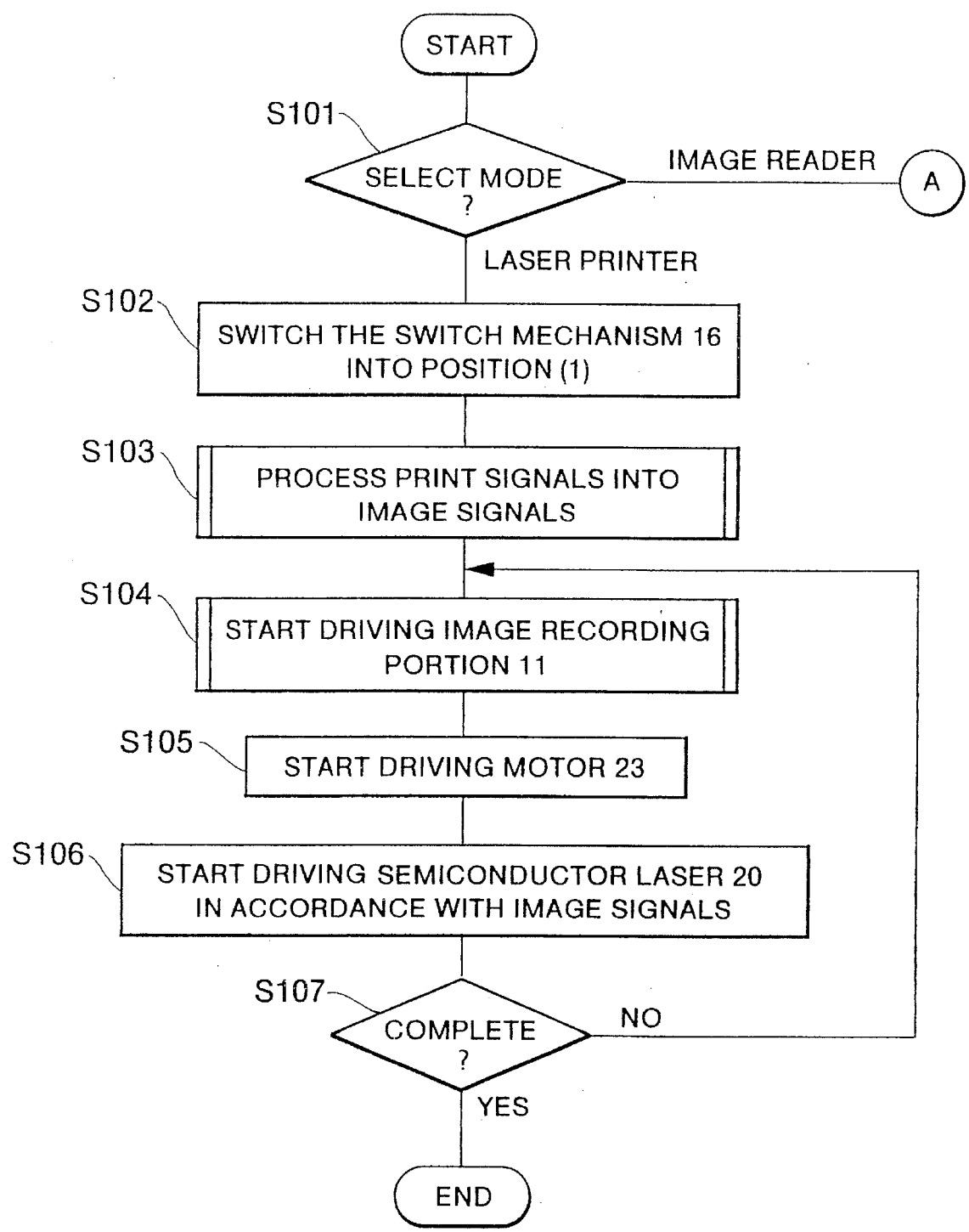
FIGS. 5A and 5B are a flow chart showing the operation of the electrophotographic image recording apparatus.
Figure 5B:
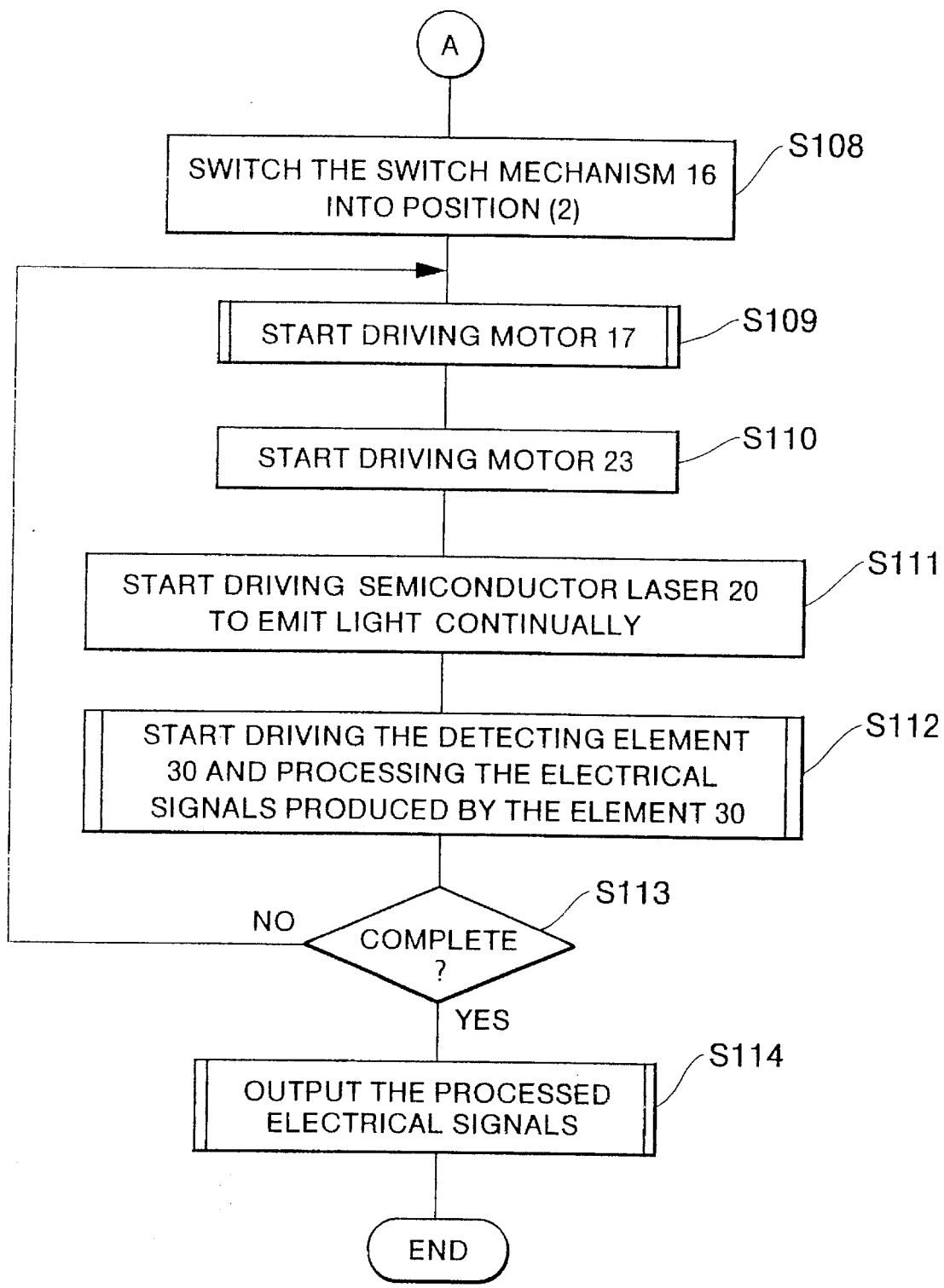

As shown in FIGS. 5A and 5B, when the power switch is thus turned ON, the main CPU 38 therefore conducts initial step S101 to detect which of the image reading mode selecting button and the image recording mode selecting button is depressed by the operator. If the image recording mode selecting button is depressed, the process goes to step S102, where the optical path switch driving unit 47 drives the driving member 16b to locate the reflective member 16a at the position (1) indicated by the dotted line of FIG. 2. In step S103, the image processing unit 42 processes the print signals fed via the printing interface 41 to produce image signals. In step S104, the electrophotographic image recording unit 49 controls the image recording portion 11 to start performing the electrophotographic image recording operation. More specifically, the electrophotographic image recording unit 49 actuates the motor 25 to start rotating the photosensitive drum 14 about its rotational axis X and causes the devices 50 through 56 to start performing their operations. Then, in step S105, the polygonal mirror driving unit 44 actuates the motor 23 to rotate the polygonal mirror 24 at a constant angular speed. In step S106, then, the light source driving circuit 43 drives the power source 20 to intermittently emit a light beam in accordance with the image signals. In other words, the light source driving circuit 43 controls the power source 20 to modulate the intensity of the light beam in accordance with the image signals. As shown in FIG. 3, the light beam reaches the collimating optical system 22 where the light is collimated. The light guiding mechanism 28 transmits the collimated light therethrough to guide it toward the rotating polygonal mirror 24. The rotating polygonal mirror 24 reflects the light beam so as to scan the light beam with a constant angular speed. The fθ lens system 26 receives and transmits therethrough the light beam scanned by the polygonal mirror 24. The light beam having passed through the fθ lens system 26 scans with a constant linear speed. The light beam thus is output from the light scanning portion 12 to enter the optical path switching mechanism 16.

The optical path switching mechanism 16 is now positioned as indicated by the dotted line of FIG. 2 and directs the light beam from the light scanning portion 12 onto the photosensitive drum 14. Thus, the light beam is scanned on the outer peripheral surface of the photosensitive drum 14 with a constant linear speed in the main scanning direction A. Because the photosensitive drum 14 is rotated about its axis, i.e., in the auxiliary scanning direction B perpendicular to the main scanning direction A, the entire area of the peripheral surface of the photosensitive drum 14 can be scanned by the light beam in accordance with the rotation of the drum 14. It is noted that the light source driving circuit 43 controls the light source 20 to modulate the light intensity in accordance with the image signals, in synchronization with the scanning operation of the polygonal mirror 24 controlled by the polygonal mirror driving unit 44. The image recording driver unit 49 controls the rotation of the photosensitive drum 14 in synchronization with the scanning operation of the polygonal mirror 24 and the driving operation of the light source 20. Accordingly, the photosensitive drum 14 is properly formed with a latent image corresponding to the image signals. The latent image is then developed by the developing unit 54, transferred onto the sheet 57 by the transferring unit 55 and fixed thereto by the fixing unit 56.

When the desired image is completely produced on the sheet 57, in step S107, the sheet 57 is discharged out of the apparatus 1, and the process is terminated.

If the image reading mode selecting button is depressed, on the other hand, the process goes from step S101 to step S108, where the optical path switch driving unit 47 drives the driving member 16b to locate the reflective member 16a at the angular position (2) indicated by the solid line of FIG. 2. Then, process proceeds to step S109, where the original conveyance control unit 45 actuates the motor 17 to rotate the conveying rollers 19. As a result, the original stand 18 moves in the auxiliary scanning direction B. Then, in step S110, the polygonal mirror driving unit 44 actuates the motor 23 to rotate the polygonal mirror 24. In step S111, the light source driving circuit 43 drives the light source 20 to continually emit light beam with uniform intensity. In other words, the light beam is now unmodulated. Then, in step S112, the original image reading unit 46 starts driving the light intensity detecting element 30 to convert the intensity of the received light into an electrical signal. When receiving the electrical signal from the light intensity detecting element 30, the original image reading unit 46 processes the electrical signal as will be described later.

As shown in FIG. 3, the light beam emitted from the light source 20 passes through the collimating optical system 22 and the guiding mechanism 28 to reflect off the rotating polygonal mirror 24. The light beam then passes through the fθ lens 26, to thereby output from the light scanning portion 12. The light beam then enters the optical path switching mechanism 16.

The optical path switching mechanism 16 now located in the position (2) indicated by the solid line of FIG. 2 directs the light beam from the light scanning portion 12 toward the original stand 18. The light beam therefore scans the original stand 18 with a constant linear speed in the main scanning direction A. The light beam passes through the original stand 18 to be irradiated on the original 32 mounted on the top surface of the original stand. The light beam reflects off the original 32 and bears thereon a picture element of the image on the original. The light beam thus bearing thereon the picture element (which will be referred to as a "picture element light beam," hereinafter) then travels in a reverse direction back to the optical path switching mechanism 16. The optical path switching mechanism 16 guides the light beam back to the light scanning portion 12.

In the light scanning portion 12, the picture element light beam passes through the fθ lens system 26, reflects off the rotating polygonal mirror 24, and reaches the light guiding mechanism 28. The light guiding mechanism 28 reflects the picture element light beam toward the light intensity detecting element 30, where the intensity of the picture element light beam is converted into an electrical signal.

The light scanning portion 12 thus performs to scan the light beam on the original 32 in the main scanning direction A. The drive rollers 19 are now performing to convey the original 32 in the auxiliary scanning direction B orthogonal to the main scanning direction A. It is noted that the original conveyance driver unit 45 drives the motor 17 to rotate the conveying rollers 19, in synchronization with the scanning operation of the polygonal mirror 24 controlled by the polygonal mirror driving unit 44. Accordingly, an entire area of the original 32 is scanned to be read out by the light beam. It is further noted that the original image reading unit 46 controls the light intensity detecting element 30 to photoelectrically convert the received light repeatedly in synchronization with the scanning operation of the polygonal mirror 24 and the conveying operation of the conveying rollers 19. Accordingly, while the polygonal mirror 24 and the conveying rollers 19 cooperate to scan the light on the original 32, the light intensity detecting element 30 serially outputs a plurality of electrical signals which indicate respective ones of all the picture elements of the image on the original. The original image reading unit 46 processes the electrical signals thus serially outputted from the light intensity detecting element 30.

When the entire area of the original is completely read out to be converted into electrical signals and processed in step S113, the processed electrical signals are outputted via the image reader interface 48 to the external device, in step S114. Then, the process is terminated.

As shown in FIG. 6, it is noted that light L2 reflected and scattered by the original 32 spreads widely relative to light L1 originally emitted from the light source 20 such as the semiconductor laser. Accordingly, the light guiding mechanism 28 is preferably constructed from the annular-shaped mirror as shown in FIG. 6. The annular-shaped mirror 28 transmits the light L1 originally emitted from the light source 20 to guide it to the polygonal mirror 24 while reflecting, at the mirror surface 28b, the widely spread light L2 from the original 32 to guide it toward the light intensity detecting element 30.

As described above, according to the present embodiment, the light scanning portion 12 operates both to scan the original 32 with unmodulated, uniform-intensity light so as to read an image from the original and to scan the photosensitive drum 14 with intensity-modulated light so as to record an image on the photosensitive drum. In other words, the light source 20, the polygonal mirror 24 and the fθ optical system 26 are all used for performing both the image reading operation and the image recording operation. Especially, in order to perform the image reading operation, the polygonal mirror 24 and the fθ optical system 26 are used both: to scan the original with the unmodulated light and to guide light modulated by the image on the original back to the light intensity detecting element 30. Thus using the parts for both the image reading function and the image recording function can simplify the overall structure of the electrophotographic image recording apparatus.

Additionally, the light intensity detecting element 30, such as a photodiode, has a simple structure is cheap, relative to the image sensors such as the contact-type image sensor and the CCD image sensor used in the conventional device. Accordingly, the entire apparatus of the present invention has a small size and can be produced with a low cost.

While the invention has been described in detail with reference to a specific embodiment thereof, it would be apparent to those skilled in the art that various changes and modifications may be made therein without departing from the spirit of the invention.

For example, in the above-described embodiment, the image reader interface 48 supplies the obtained electrical signals to the external device. However, the image reader interface 48 may be connected to the printer interface 41 so as to supply the electrical signals to the printer interface 41 and cause the image recording unit 11 to record an image the same with as that of the original. In this case, the apparatus 1 serves as a copying machine. It is noted that in order to cause the apparatus 1 to serve as the copying machine, the CPU 38 may automatically control the apparatus 1 to first operate in the image reading mode and then operate in the image recording mode.

The rotational polygonal mirror 24 may be replaced with various types of light scanning members such as a galvanometer-driven light deflector. The photosensitive drum 14 may be replaced with other various types of photosensitive media.

As described above, the electrophotographic image recording apparatus of the present invention is provided with the optical path switching mechanism. The optical path switching mechanism is located to receive light outputted from the light scanning portion and switchingly direct the received light to one of the image reading portion and the electrophotographic image recording portion.

In the electrophotographic image recording apparatus with the above structure, in order to record a desired image onto an output medium, the optical path switching mechanism switches an optical path for the light from the light scanning portion toward the electrophotographic image recording portion where the light is used for an image recording operation. In order to read out an image from an original, on the other hand, the optical path switching mechanism switches an optical path for the light from the light scanning portion toward the image reading portion where the light is used for an image reading operation.

Thus, the electrophotographic image recording apparatus of the present invention can be simple in structure but can operate both the image reading function and the image recording function.

What is claimed is:

1. An image reading and recording apparatus, for reading an image from an original and for recording a latent image on a photosensitive medium, comprising:

a light scanning portion for scanning a spot light beam in a predetermined scanning direction, the light scanning portion including at least a light source for emitting the spot light beam and a light scanner for receiving the spot light beam and for scanning the spot light beam in the predetermined scanning direction;

an image reading portion for providing an original on a first imaging plane onto which the light beam scanned by the light scanning portion is imaged, and for reading out a plurality of picture elements arranged on the original in a direction corresponding to the predetermined scanning direction, the image reading portion including a detecting member for receiving the spot light beam reflected from the original and producing a series of electrical signals which indicate respective ones of the plurality of picture elements arranged on the original;

an image recording portion for providing a photosensitive medium on a second imaging plane different from the first imaging plane, onto which the light beam scanned by the light scanning portion is imaged, and for forming a plurality of latent picture elements on the photosensitive medium arranged in another direction corresponding to the predetermined scanning direction; and an optical path switching member for selectively guiding the light beam scanned by the light scanning portion to one of the image recording portion and the image reading portion, wherein the optical path switching member includes:

a reflective member for receiving the light beam scanned by the light scanning portion and for reflecting the light beam; and an angular position changing member for changing an angular position of the reflective member between a first angular position for reflecting the light beam to the photosensitive medium and a second angular position for reflecting the light beam to the original, wherein the reflective member located on the second angular position guides the light beam reflected from the original back to the light scanner and the light scanner guides the light beam in a direction back to the light source, and a light beam directing member is provided at a position between the light source and the detecting member and the light scanner, the light beam directing member directing the light beam originally emitted from the light source to the light scanner while directing the light beam from the light scanner to the detecting member to be detected by said detecting member.

2. An image reading and recording apparatus as claimed in claim 1, wherein the light scanning portion further includes a light imaging lens capable of imaging the spot light beam onto the first imaging plane and onto the second imaging plane, and wherein the optical path switching member further includes a light source controller for controlling the light source to emit the spot light beam of uniform intensity when the reflective member is located in the second angular position and for controlling the light source to modulate intensity of the spot light beam in accordance with image signals in synchronization with the scanning operation by the light scanning portion so as to form, on the photosensitive medium, the plurality of latent picture elements corresponding to the image signals when the reflective member is located in the first angular position.

3. An image reading and recording apparatus as claimed in claim 1, further comprising output means for outputting the series of electrical signals produced by the detecting member.

4. An image reading and recording apparatus as claimed in claim 1, wherein the light beam directing member includes an annular-shaped reflective mirror for transmitting the light beam originally emitted from the light source to direct it toward the light scanner and for reflecting the light beam reflected and scattered by the original and reflected by the light scanner to direct it toward the detecting member.

5. An image reading and recording apparatus as claimed in claim 4, wherein the detecting member receives the spot light beam reflected from the original and photoelectrically converts the received spot light beam into an electrical signal indicative of an intensity of the spot light beam, to thereby produce a series of electrical signals which indicate respective ones of the plurality of picture elements arranged on the original, and wherein the light source controller controls the light source in accordance with the electrical signals obtained by the detecting member to thereby cause the image recording portion to form a latent image corresponding to the original.

6. An image reading and recording apparatus as claimed in claim 4, further comprising:

an input port for inputting the image signals from an external device, the light source controller controlling the light source to emit the light beam with its intensity modulated in accordance with the image signals; and an output port for outputting, to an external device, the electrical signals obtained by the detecting member.

7. An image reading and recording apparatus as claimed in claim 4, wherein the image recording portion further includes:

a developing unit for developing the latent image formed on the photosensitive medium into a visible image;

a transferring unit for transferring the visible image onto an output medium; and a fixing unit for fixing the visible image onto the output medium.

8. An image reading and recording apparatus as claimed in claim 4, wherein the image reading portion includes:

an original stand for mounting thereon the original; and a conveying roller for moving the original stand, in synchronization with the scanning operation by the light scanning portion, in a direction orthogonal to the direction corresponding to the predetermined scanning direction.

9. An image reading and recording apparatus of claim 8, wherein the image recording portion includes:

a photosensitive drum of a cylindrical shape with its central axis located to extend in the another direction corresponding to the predetermined scanning direction, the photosensitive drum being provided with photosensitive material at its peripheral surface; and a motor for rotating the photosensitive drum about the central axis, in synchronization with the scanning operation by the light scanning portion, to thereby convey the photosensitive material in the another direction orthogonal to the direction corresponding to the predetermined scanning direction.

10. An electrophotographic image recording apparatus, for reading an image from an original and for electrophotographically recording an image on a desired image output medium, comprising:

an input port for inputting image signals indicative of an image desired to be formed on an image output medium;

a light source for emitting a light beam;

a light source controller for controlling the light source to emit the light beam;

a light scanning device for receiving the light beam emitted from the light source, and for scanning the light beam in a main scanning direction;

an original conveying device for conveying an original in an auxiliary scanning direction orthogonal to the main scanning direction, the original conveying device conveying the original along a first imaging plane onto which the scanned light beam is imaged;

a photosensitive medium conveying device for conveying a photosensitive medium in another auxiliary scanning direction orthogonal to the main scanning direction, the photosensitive medium conveying device conveying the photosensitive medium along a second imaging plane onto which the scanned light beam is imaged, the second imaging plane being different from the first imaging plane;

a light guiding member for receiving the light beam scanned by the light scanning device and for selectively guiding the light beam to either one of the original conveyed by the original conveying device and the photosensitive medium conveyed by the photosensitive medium conveying device;

a mode selecting device for selecting one of an image reading mode for reading out an image from the original and an image recording mode for recording a desired image on the output medium;

a switching control device for controlling the light source and the light guiding member, the switching control device controlling, in the image reading mode, the light source to continually emit the light beam with uniform intensity and the light guiding member to guide the light beam to the original, the light beam thus guided to the original reflecting thereat to bear thereon information on the image on the original, the switching control device controlling, in the image recording mode, the light source to modulate intensity of the light beam to be emitted therefrom dependently on the image signals inputted from the input port in synchronization with the scanning operation by the light scanning device and the light guiding member to guide the light beam to the photosensitive medium conveyed by the photosensitive medium conveying device, the light beam thus guided to the photosensitive medium forming thereon a latent image corresponding to the image signals;

a light beam detecting device for detecting the light beam reflected from the original in synchronization with the scanning operation by the light scanning device and for producing a series of electrical signals;

an output port for outputting the series of electrical signals produced by the light beam detecting device; and an electrophotographic image recording device for developing the latent image formed on the photosensitive medium into a visible image and transferring the visible image onto a desired output medium, wherein the light guiding member selected to guide the light beam to the original also guides the light beam reflected from the original back to the light scanning device, the light scanning device directing the light in a direction back to the light source, and wherein a light beam directing member is located at a position between the light source and the light scanning device for directing the light guided back from the light scanning device to the light beam detecting device, the light beam directing member directing the light originally emitted from the light source to the light scanning device.

11. An electrophotographic image recording apparatus of claim 10, further comprising an imaging member located at a position between the light source and the light scanning device for receiving the light beam emitted from the light source, the imaging member being capable of imaging the light beam onto the original and the photosensitive medium which are respectively located on the first imaging plane and the second imaging plane, the imaging member forming a light beam spot on the original to read out every picture element of the image on the original and forming a light beam spot on the photosensitive drum to form every picture element of the latent image.

12. An electrophotographic image recording apparatus of claim 11, wherein the light beam directing member includes an annular-shaped reflective mirror for transmitting the light beam originally emitted from the light source to direct it toward the light scanning device and for reflecting the light beam reflected and scattered by the original to direct it toward the light beam detecting device.

13. An electrophotographic image recording apparatus of claim 11, wherein the light guiding member includes:

a reflective mirror for receiving and reflecting the light beam scanned by the light scanning device; and a motor for rotating the reflective mirror by a predetermined angle so as to locate the reflective mirror at two predetermined angular positions, the reflective mirror located at one of the two predetermined angular positions being capable of directing the light beam from the light scanning device to the original and the reflective mirror located at the other one of the two predetermined angular positions being capable of directing the light beam from the light scanning device to the photosensitive medium.

14. An electrophotographic image recording apparatus of claim 13, wherein the switching control device includes a driving device for driving the motor to rotate the rotational shaft to locate the reflective mirror at the one of the two predetermined angular positions at the image reading mode and to locate the reflective mirror at the other one of the two predetermined angular positions at the image recording mode.

15. An electrophotographic image recording apparatus of claim 11, wherein the original conveying device includes:

an original stand for mounting thereon the original;

a conveying roller for moving the original stand in the auxiliary scanning direction to thereby convey the original in the auxiliary scanning direction orthogonal to the main scanning direction; and a motor for rotating the conveying roller to convey the original stand, and wherein the switching control device includes another driving device for driving the motor at the image reading mode to rotate the conveying roller to move the original stand in the auxiliary scanning direction.

16. An electrophotographic image recording apparatus of claim 11, wherein the photosensitive medium conveying device includes:

a photosensitive drum of a cylindrical shape with its central axis located relative to the light scanning device to extend in the main scanning direction, the photosensitive drum being provided with photosensitive material at its peripheral surface; and a motor for rotating the photosensitive drum about the central axis to thereby move the photosensitive material in the auxiliary scanning direction orthogonal to the main scanning direction, and wherein the switching control device includes a further driving device for driving the motor at the image recording mode to rotate the photosensitive drum.

17. An electrophotographic image copying apparatus, for reading an image from an original in an image reading step and for electrophotographically recording an image the same as the image of the original on a desired image output medium in an image recording step, comprising:

a light source for emitting a light beam;

a light source controller for controlling the light source to emit the light beam;

a light scanning device for receiving the light beam emitted from the light source and for scanning the light beam in a main scanning direction;

an original conveying device for conveying an original in an auxiliary scanning direction orthogonal to the main scanning direction, the original conveying device conveying the original along a first imaging plane onto which the scanned light beam is imaged;

a photosensitive medium conveying device for conveying a photosensitive medium in another auxiliary scanning direction orthogonal to the main scanning direction, the photosensitive medium conveying device conveying the photosensitive medium along a second imaging plane onto which the scanned light beam is imaged, the second imaging plane being different from the first imaging plane;

a light guiding member for receiving the light beam scanned by the light scanning device and for selectively guiding the light beam to either one of the original conveyed by the original conveying device and the photosensitive medium conveyed by the photosensitive medium conveying device;

a light beam detecting device for detecting the light beam guided to and reflected at the original in synchronization with the scanning operation by the light scanning device and for producing a series of electrical signals;

a switching control device for controlling both the light source and the light guiding member, the switching control device controlling, in an image reading step, the light source to continually emit the light beam with uniform intensity and the light guiding member to guide the light beam to the original in order to read out an image from the original, the light beam thus guided to the original reflecting thereat to bear thereon information on the image on the original, the switching control device controlling, in an image recording step, the light source to modulate intensity of the light beam to be emitted therefrom dependently on the electrical signals produced by the light beam intensity detecting device in synchronization with the scanning operation by the light scanning device and the light guiding member to guide the light beam to the photosensitive medium conveyed by the photosensitive medium conveying device, the light beam thus guided to the photosensitive medium forming thereon a latent image corresponding to the image signals; and an electrophotographic image recording device for developing the latent image formed on the photosensitive medium into a visible image and transferring the visible image onto a desired output medium, wherein the light guiding member selected to guide the light beam to the original also guides the light beam reflected from the original back to the light scanning device, the light scanning device directing the light in a direction back to the light source, and wherein a light beam directing member is located at a position between the light source and the light scanning device for directing the light guided back from the light scanning device to the light beam detecting device, the light beam directing member directing the light originally emitted from the light source to the light scanning device.

18. An image reading and recording apparatus as claimed in claim 1, wherein a distance between the first imaging plane and the reflective member is equal to a distance between the second imaging plane and the reflective member.

* * * * *